(12) United States Patent
Hutchison et al.

(10) Patent No.: US 10,190,640 B2
(45) Date of Patent: Jan. 29, 2019

(54) BEARING WITH INTEGRATED SHUNT

(71) Applicant: Schaeffler Technologies AG & Co. KG, Herzogenaurach (DE)

(72) Inventors: Chris Hutchison, Gastonia, NC (US); Michael White, Lake Wylie, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/467,353

(22) Filed: Mar. 23, 2017

(65) Prior Publication Data

US 2017/0276179 A1    Sep. 28, 2017

Related U.S. Application Data (60) Provisional application No. 62/312,147, filed on Mar. 23, 2016.

(51) Int. Cl.

| | | |
|---|---|---|
| *F16C 41/00* | (2006.01) | |
| *F16C 19/06* | (2006.01) | |
| *F16C 33/58* | (2006.01) | |
| *F16C 33/78* | (2006.01) | |

(52) U.S. Cl.
CPC ............ *F16C 41/002* (2013.01); *F16C 19/06* (2013.01); *F16C 33/58* (2013.01); *F16C 33/583* (2013.01); *F16C 33/7816* (2013.01); *F16C 33/7856* (2013.01); *F16C 2202/32* (2013.01); *F16C 2380/27* (2013.01)

(58) Field of Classification Search
CPC ........ F16C 41/002; F16C 19/52; F16C 19/06; F16C 33/62; F16C 33/78; F16C 33/58; F16C 33/7816; F16C 33/7856; F16C 33/583; F16C 2202/32; F16C 2380/27
See application file for complete search history.

(56) References Cited

U.S. PATENT DOCUMENTS

| | | | |
|---|---|---|---|
| 1,152,680 A | 9/1915 | Wieselgreen | |
| 3,924,906 A | 12/1975 | Kitaoka | |
| 4,417,954 A | 11/1983 | Birkle et al. | |
| 4,801,270 A * | 1/1989 | Scarlata | H01R 4/64 |
| | | | 439/28 |
| 5,059,041 A | 10/1991 | Watanabe et al. | |
| 5,139,425 A * | 8/1992 | Daviet | F16C 19/184 |
| | | | 277/402 |
| 5,853,294 A * | 12/1998 | Rehder | F16C 41/002 |
| | | | 439/17 |

(Continued)

FOREIGN PATENT DOCUMENTS

| | | | |
|---|---|---|---|
| EP | 2628822 A1 | 8/2013 | |
| JP | 01131319 A * | 5/1989 | ............... H01R 4/64 |

(Continued)

*Primary Examiner* — Alan B Waits
(74) *Attorney, Agent, or Firm* — Volpe and Koenig, P.C.

(57) ABSTRACT

A bearing assembly having an inner ring, outer ring, and a plurality of rolling elements and an integrated electrically conductive element, such as an electrical shunt system manufactured of bundled or braided conductive filaments. The bearing integrated electrical shunt system consists of a fixed ring and an integrated electrically conductive element, such as bundled carbon fiber filaments, that contact a rotating ring. The integrated electrical conductive element can be integrated with the bearing seal.

8 Claims, 8 Drawing Sheets

(56) References Cited

U.S. PATENT DOCUMENTS

| | | | | |
|---|---|---|---|---|
| 7,136,271 | B2* | 11/2006 | Oh | H05F 3/02 |
| | | | | 361/221 |
| 7,878,814 | B2* | 2/2011 | Chin | F16J 15/064 |
| | | | | 439/17 |
| 9,581,203 | B2* | 2/2017 | White | F16C 41/002 |
| 2011/0317953 | A1* | 12/2011 | Moratz | F16C 33/7843 |
| | | | | 384/572 |
| 2013/0209006 | A1 | 8/2013 | Kolev et al. | |
| 2013/0301971 | A1* | 11/2013 | Cudrnak | F16C 33/76 |
| | | | | 384/477 |
| 2014/0334758 | A1* | 11/2014 | White | F16C 33/7843 |
| | | | | 384/477 |

FOREIGN PATENT DOCUMENTS

| | | | | |
|---|---|---|---|---|
| JP | 07071451 A | * | 3/1995 | F16C 19/52 |
| JP | 10252745 A | * | 9/1998 | F16C 19/52 |
| JP | 11218143 A | * | 8/1999 | F16C 33/7846 |
| JP | 2002295492 A | * | 10/2002 | |

* cited by examiner

BEARING WITH INTEGRATED SHUNT

FIELD

The present invention relates to devices for grounding shaft electrical currents in electrical machines such as AC and DC electrical motors, generators, and other rotating shaft machines and more specifically to a grounding shaft electrical currents in bearings.

BACKGROUND

The advent, development, and increasing use of electrical machines coupled to Pulse Width Modulated (PWM) variable speed inverter drives utilizing rapid switching devices such as Insulated Gate Bi-Polar Transistors (IGBTs) has resulted in an increase in rolling element bearing failures in electrical machines. The reduced bearing life and increased rate of bearing failures is due to currents flowing from the rotating shaft to the machine frame through the bearings. Such currents flowing through the bearing manifest as damage due to Electrical Discharge Machining (EDM) between the bearing raceways and rolling elements thus causing physical mechanical damage of the bearing raceways and rolling elements which may ultimately cause premature failure of the bearing assembly.

Shaft induced electrical currents are inherent to electric motors and generators due to mechanical asymmetries in the electrical machine. Additionally, due to the very high rate of switching frequencies of PWM inverter drives, the Common Mode Voltage (CMV) is increased over non-PWM driven machines. This increased CMV causes a difference in electrical potential between the rotor shaft and the stator frame of the machine. When the CMV potential exceeds the impedance of the bearings, a current is induced in the shaft, and the current passes through the bearings seeking ground, potentially causing EDM damage to the bearings.

Figure 1:
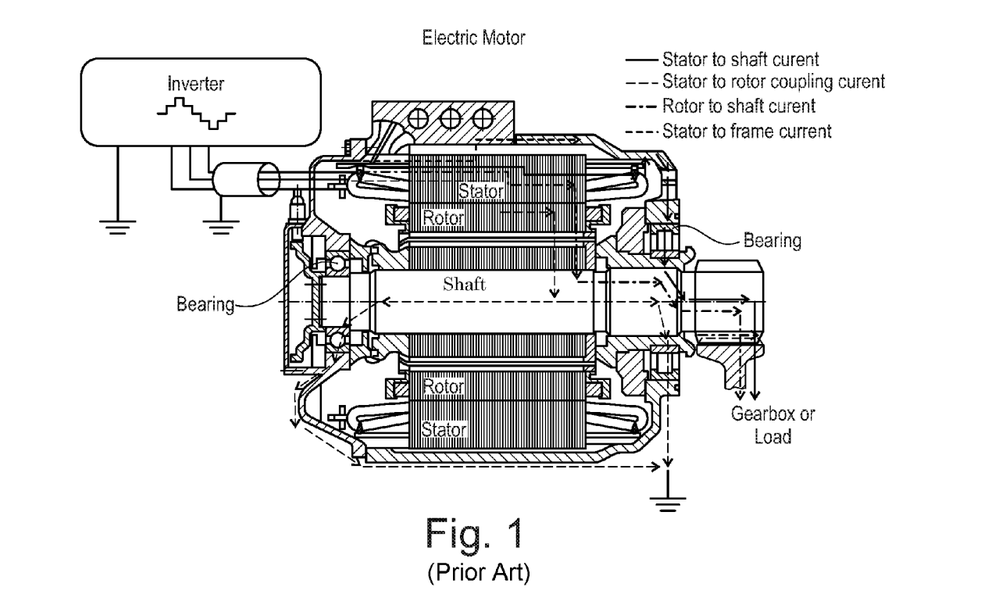
FIG. 1 is a schematic view of electrical current paths in inverter driven machines.

FIG. 1 shows the potential electrical current paths in inverter driven machines. These consist of: Stator to shaft current; Shaft to rotor coupling current; Rotor to shaft current; and Stator to frame current. Both the stator to shaft and stator to rotor coupling current can potentially cause damage to the bearings.

Figure 2:
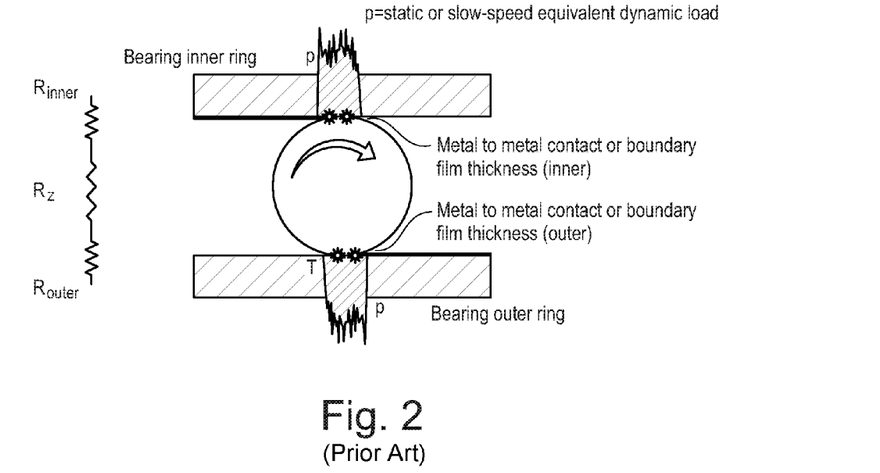
FIG. 2 illustrates a schematic view of a bearing in static operation in an inverter driven machine.

FIG. 2 illustrates a schematic, cross sectional view of a bearing in static operation in an inverter driven machine. During static or stationary conditions the lubricant (e.g. oil or grease) is displaced between the rolling element and raceway mating surfaces in contact and under load thus causing a low resistance for electrical currents to pass between the rolling elements and raceway surfaces.

Figure 3:
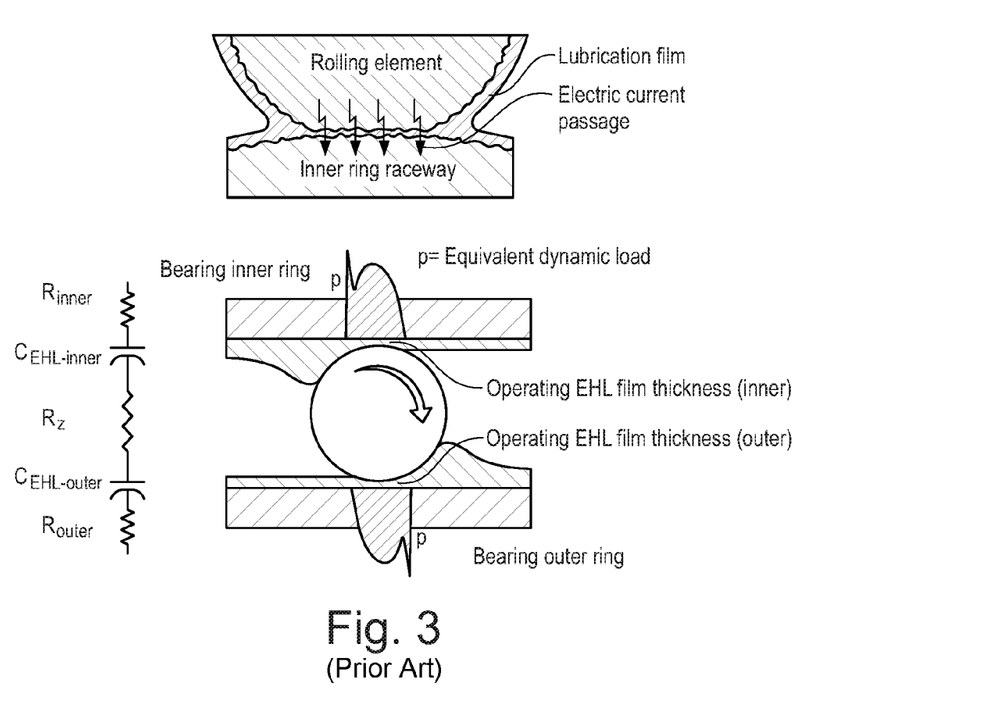
FIG. 3 illustrates a schematic view of a bearing in normal operation in an inverter driven machine.

FIG. 3 illustrates a schematic view of a bearing in normal operation in an inverter driven machine. During transient, defined as startup condition greater than ~15% of rated rotational speed, and normal steady-state operating conditions, a lubricant film thickness is generated and maintained between the rolling element and raceway surfaces. This Elasto-Hydrodynamic Lubricant (EHL) film thickness causes the mating surfaces to separate from contact and "ride" on a film of lubricant.

Many methods have been employed to prevent shaft induced currents from causing EDM damage to the bearings. Such technologies include di-electric ceramic coatings such as aluminum oxide or silicon oxide on the bearing external surfaces or bearing housing, use of Faraday shields to prevent the charge build-up on shafts, electrically conductive bearing grease, and shaft-contacting ground shunts made of electrically conductive materials such as copper, brass, or carbon.

Di-electric ceramic bearing coatings have been utilized with some success but have several drawbacks. The coating is very hard and brittle and can fracture during installation or after installation under load. The resulting cracks can allow current to pass through the bearing. Di-electric ceramic bearing coatings also have a limited di-electric strength. At high voltage potential, current can pass through imperfections inherent within the coating structure, causing an arc that compromises the coating, passing through the coating and potentially causing EDM damage to the bearing.

Faraday shields have been employed with success but are very expensive to implement in most applications in industry.

Electrically conductive grease allows the current to continuously pass through the bearing surfaces but may contain elements such as copper, carbon, or phosphorus which can cause excessive wear of the bearing surfaces leading to premature failure of the bearing.

What is needed in the art is a grounding system that is located very near to the bearing rolling element to raceway interfaces (i.e. integrated within the bearing), that remains an effective shunt system for a prolonged period of operation, requires no maintenance or replacement, and is integrated in the bearing assembly for ease of installation

BRIEF SUMMARY

Example aspects broadly comprise a bearing assembly having an inner ring, outer ring, and a plurality of rolling elements and an integrated electrically conductive element, such as an electrical shunt system manufactured of bundled or braided conductive filaments.

The bearing integrated electrical shunt system consists of a fixed ring and an integrated electrically conductive element, such as bundled carbon fiber filaments, that contact a rotating ring. The integrated electrical conductive element can be integrated with the bearing seal.

In an example embodiment, an electrical conductive element may also be referred to as a shunt or electrical shunt. The electrical conductive element or shunt includes a first bundle of electrical conductive filaments bound together at least at one end and in contact with one of the inner ring or outer ring along a length of the bundle of electrical conductive filaments and a second metallic conductive element in operative contact with the first bundle of electrical conductive filaments and in contact with the other of the inner ring or outer ring. Preferably, further bundles of electrical conductive filaments are distributed about the bearing. The bundles of electrical conductive filaments can be two or more carbon fiber filaments, strands of copper or other conductive material. The bundle of electrical conductive filaments may be connected at one end or both ends and may further be braided or otherwise twisted together.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 4:
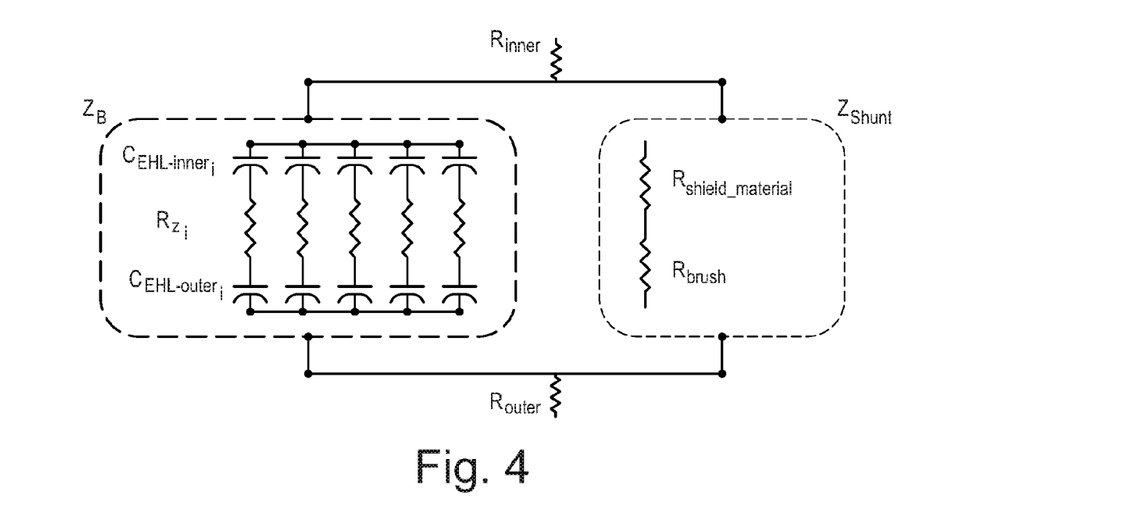
FIG. 4 illustrates a schematic view of impedance across a bearing and a shunt according to one example embodiment.

The following description is made with reference to FIGS. 4-16. FIG. 4 illustrates a schematic view of impedance across a bearing and an electrical conductive element or shunt according to the present disclosure. In all example embodiments shown, the following relationship is contemplated:

$$Z_{Shunt} \ll Z_B$$

Where $Z_{Shunt}$ represents the total impedance of the electrical conductive element or shunt system that is a near constant function of the sum of the material resistance and contact resistance values of a single or double sided shunt system during static or dynamic operating conditions and;

$Z_B$ represents the total variable impedance of the rolling element to raceway interface which is a function of the capacitive resistance of the lubricant film, EHL film thickness, contact surface area between rolling element and raceway surfaces, the surface roughness of the rolling element and raceway surfaces, rotational speed, applied load, and the resulting load zone in the bearing, namely the number of capacitively linked rolling elements in parallel.

Figure 5:
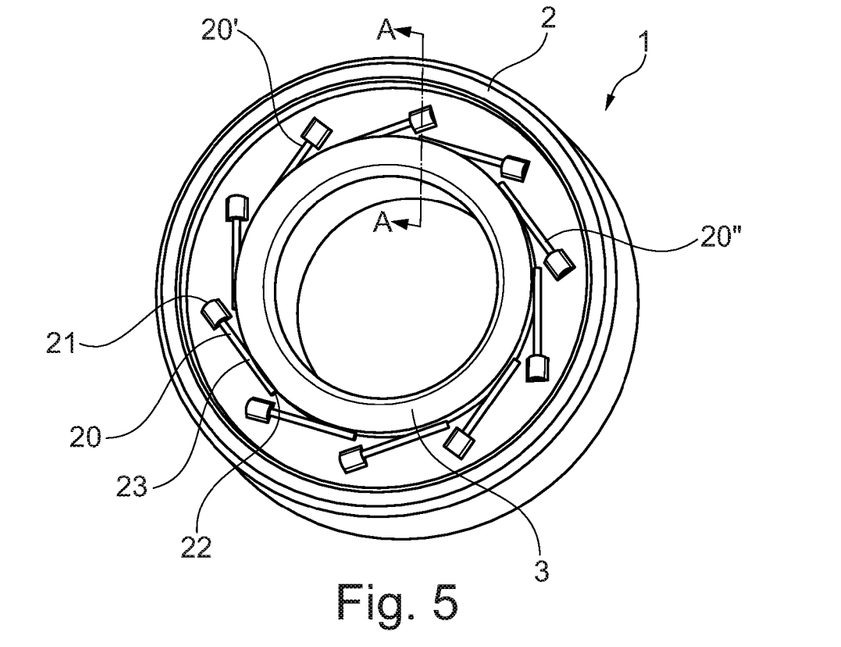
FIG. 5 illustrates a perspective view of a bearing according to a first example embodiment of the invention.
Figure 6:
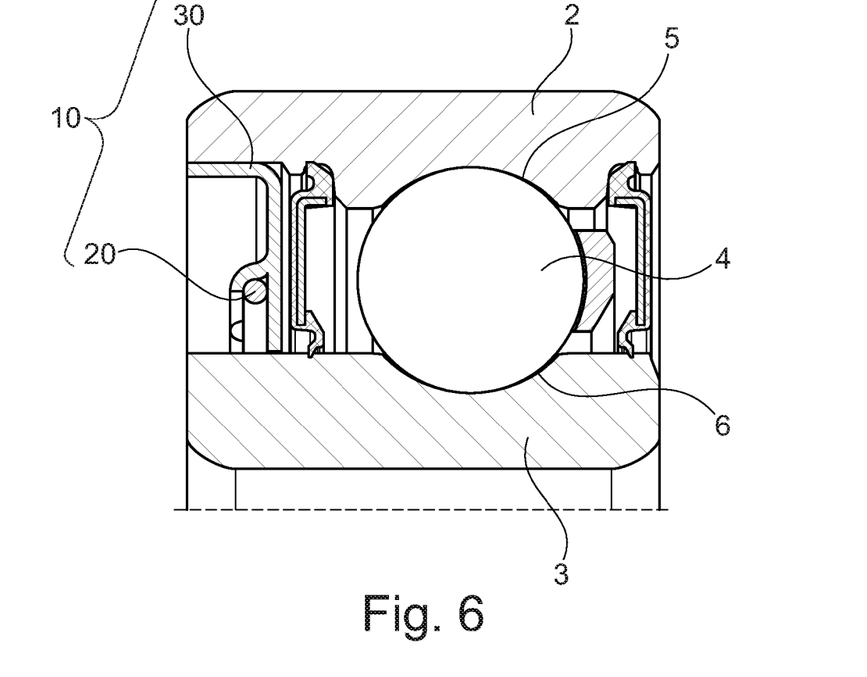
FIG. 6 illustrates a cross-sectional view of the bearing of FIG. 5, taken along line A-A.

FIGS. 5 and 6 illustrate a bearing according to a first example embodiment of the invention. Bearing 1 including outer ring 2 having a first raceway 5, inner ring 3 having a second raceway 6, rolling elements 4 (FIG. 6) disposed between the first and second raceways; and an electrical conductive element 10 extending from the non-rotating ring, one of the inner ring 3 or outer ring 2 and extending in the direction of the rotating member, the other of the inner ring 3 or outer ring 2, forming a conductive path between the inner ring and outer ring. This electrical conductive element may also be referred to as a shunt or electrical shunt. The electrical conductive element or shunt includes a first bundle of electrical conductive filaments 20 bound together at least at one end 21 or 22 and in contact with one of the inner ring 3 or outer ring 2 along a length 23 of the bundle of electrical conductive filaments 20 and a second metallic conductive element 30 in operative contact with the first bundle of electrical conductive filaments 20 and in contact with the other of the inner ring 3 or outer ring 2. Preferably, further bundles of electrical conductive filaments, 20', 20'', etc. are distributed about the bearing. The distribution of this plurality of bundles of conductive filaments is shown as symmetric in FIG. 5, however, any placement is contemplated by the present disclosure. The bundles of electrical conductive filaments 20 can be two or more carbon fiber filaments, strands of copper or other conductive material. The bundle of electrical conductive filaments may be connected at one end or both ends, 21 or 22, and may further be, but are not required to be, braided or otherwise twisted together. Bundle(s) of electrical conductive filaments 20 are mechanically fixed to the metallic conductive element, for example, by crimping, as shown in FIG. 6.

Figure 7:
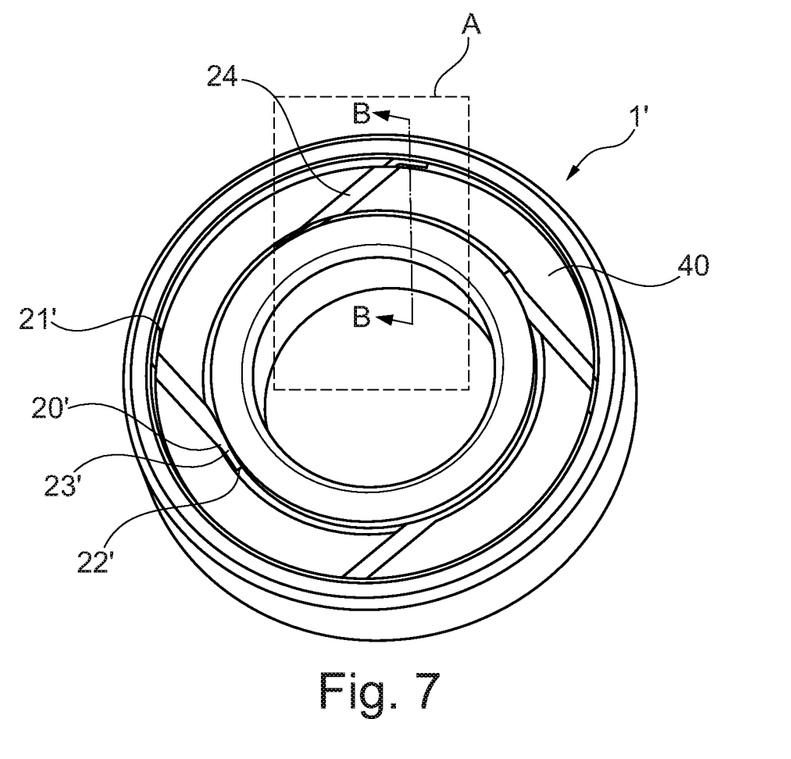
FIG. 7 illustrates a perspective view of a bearing according to a second example embodiment of the invention.
Figure 8:
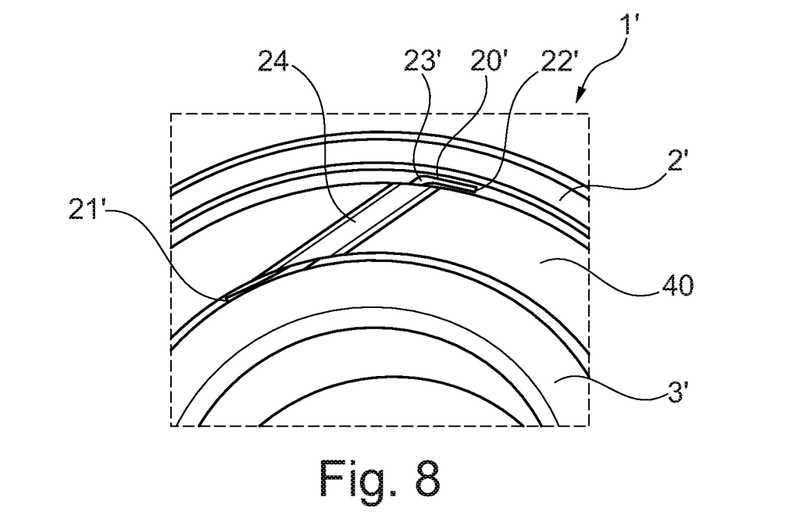
FIG. 8 illustrates an enhanced view of section A of the bearing of FIG. 7.
Figure 9:
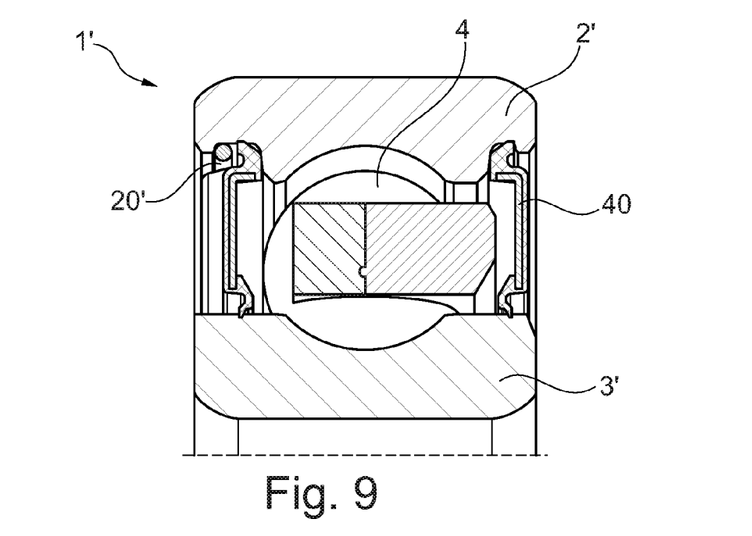
FIG. 9 illustrates a cross-sectional view of the bearing of FIG. 7, taken along line B-B.

FIGS. 7, 8 and 9 illustrate a bearing according to a second example embodiment of the invention. Bearing 1' including outer ring 2' having a first raceway 5', inner ring 3' having a second raceway 6', rolling elements 4' (FIG. 9) disposed between the first and second raceways; and an electrical conductive element 10' extending from the non-rotating ring, one of the inner ring 3' or outer ring 2' and extending in the direction of the rotating member, the other of the inner ring 3' or outer ring 2', forming a conductive path between the inner ring and outer ring. In this embodiment, electrical conductive element 10' is part of a closure element assembly 40 for the bearing 1'. The closure element, includes shields, seals and other closure elements generally understood to be used in rolling bearings.

In this second example embodiment, the closure element is a polymer lip seal, but, other closure elements are contemplated by the present disclosure. The electrical conductive element 10' includes at least one conductive filament 20' having a first end 21' and a second end 22', assembled or mechanically fixed to the closure element 40, the first end 21' contacting the outer ring 2' along a length of the filament 23' and the second end 22' contacting the inner ring 3' along a length of the filament 23', forming an electrically conductive path between the outer ring 2' and the inner ring 3'. In this example embodiment filament 20' is a bundle of filaments bound together at least at one end. The bundle may also be braided or otherwise twisted. Further, the bundle of filaments 20' is mechanically fixed to the closure element 40 by overmolding, or molding in place at a middle portion 24 of the filament 20, using the material of the closure element, for example polymer. Multiple filaments 20' may be distributed about the bearing, as shown in FIG. 7.

Figure 10:
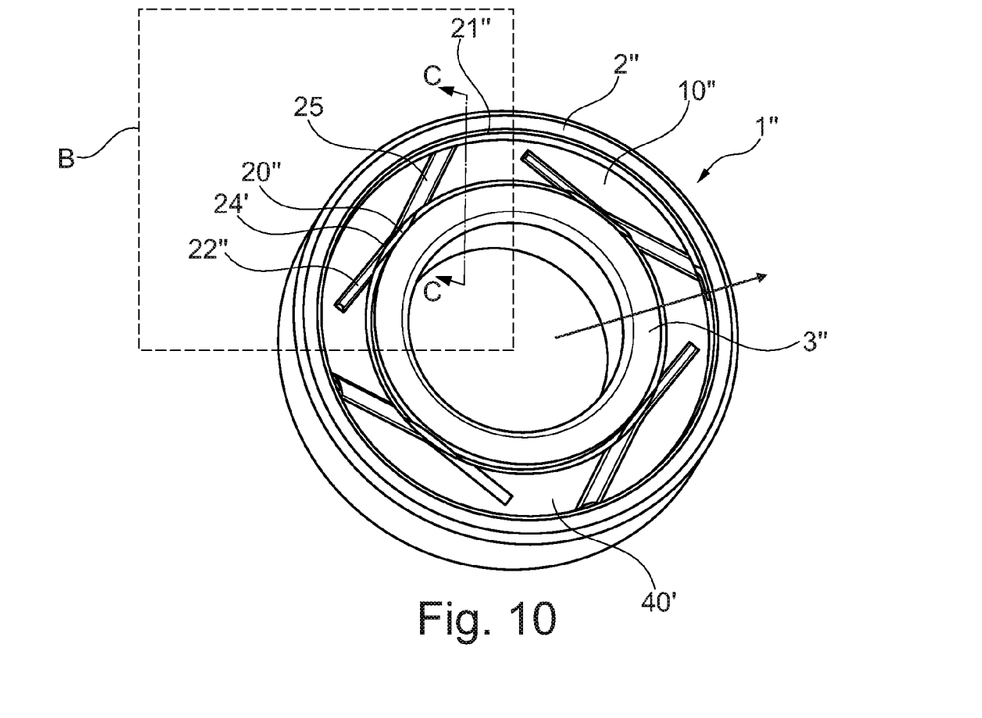
FIG. 10 illustrates a perspective view of a bearing according to a third example embodiment of the invention.
Figure 11:
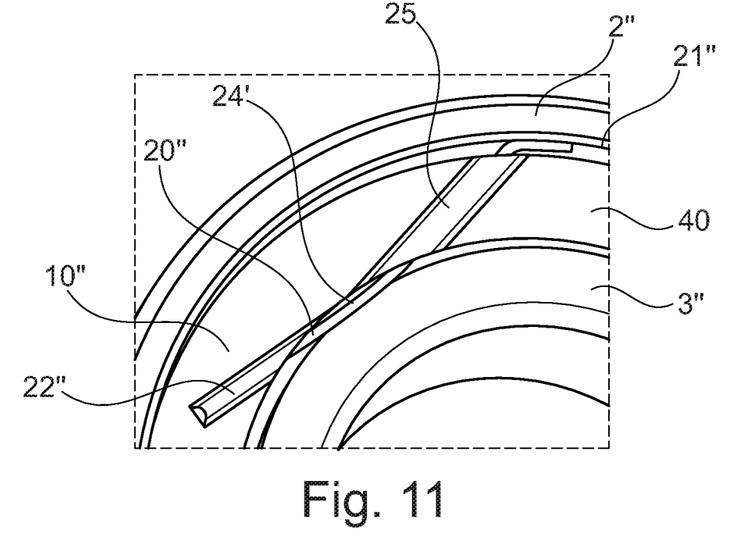
FIG. 11 illustrates an enhanced view of section B of the bearing of FIG. 10.
Figure 12:
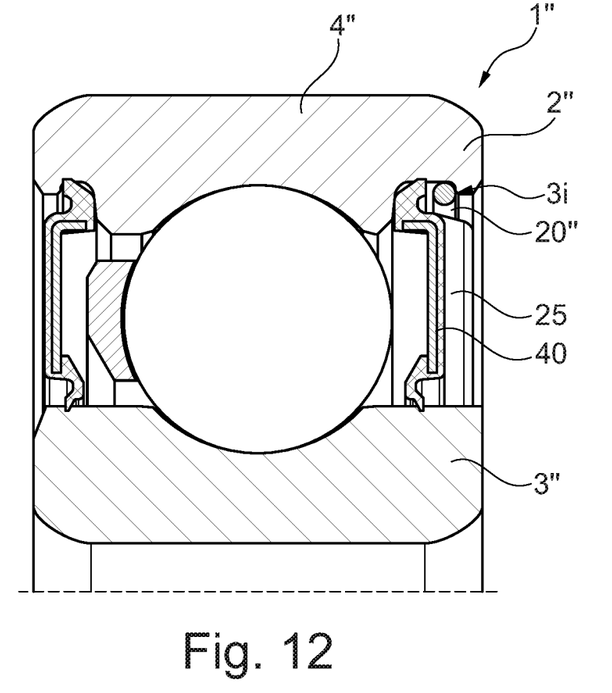
FIG. 12 illustrates a cross-sectional view of the bearing of FIG. 10, taken along line C-C.

FIGS. 10, 11 and 12 illustrate a bearing according to a third example embodiment of the invention. Bearing 1" includes outer ring 2" having a first raceway 5", inner ring 3" having a second raceway 6", rolling elements 4" (FIG. 12) disposed between the first and second raceways; and an electrical conductive element 10' extending from the non-rotating ring, one of the inner ring 3" or outer ring 2" and extending in the direction of the rotating member, the other of the inner ring 3" or outer ring 2", forming a conductive path between the inner ring and outer ring. In this embodiment, electrical conductive element 10" is part of a closure element assembly 40' for the bearing 1". The closure element, includes shields, seals and other closure elements generally understood to be used in rolling bearings. In this third example embodiment, the closure element is a polymer lip seal, but, other closure elements are contemplated by the present disclosure. The electrical conductive element 10" includes at least one conductive filament 20" having a first end 21" and a second end 22", assembled or mechanically fixed to the closure element 40', the first end 21" contacting the outer ring 2" along a length of the filament 23' and a middle portion 24" contacting the inner ring 3" along a length of the filament 23', forming an electrically conductive path between the outer ring 2" and the inner ring 3". In this example embodiment filament 20" is a bundle of filaments bound together at least at one end. The bundle may also be braided or otherwise twisted. Further, the bundle of filaments 20" is mechanically fixed to the closure element 40' by overmolding, at a first intermediate location 25 and at the second end 22" using the material of the closure element, for example polymer. Multiple filaments 20" may be distributed about the bearing, as shown in FIG. 10. Filament 20" may be secured or assisted in maintaining contact with outer ring 2" by inserting into a groove or adjacent a lip 31, machined or formed in outer ring 2".

Figure 13:
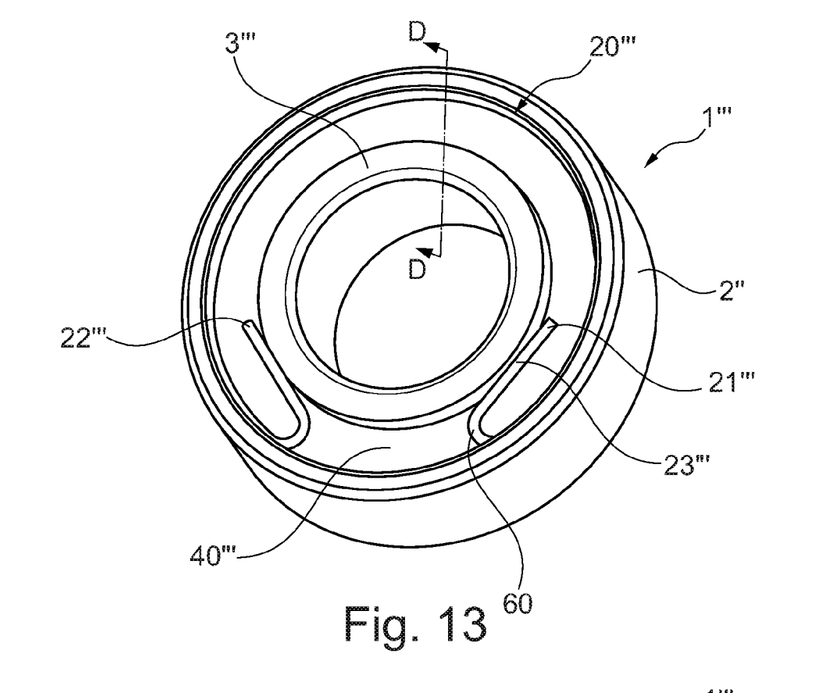
FIG. 13 illustrates a perspective view of a bearing according to a fourth example embodiment of the invention.
Figure 14:
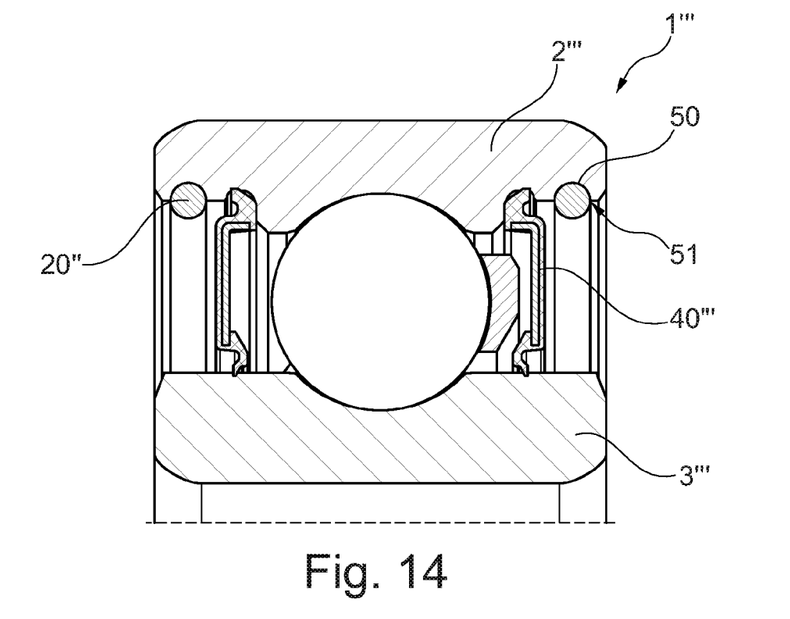
FIG. 14 illustrates a cross-sectional view of the bearing of FIG. 13, taken along line D-D.

FIGS. 13 and 14 illustrate a bearing according to a fourth example embodiment of the invention. Bearing 1''' is similar in design and geometry as disclosed in previous embodiments in the present disclosure. In this embodiment, however, electrical conductive filament 20''' is recessed or inserted into a groove 50 with lip 51 in the fixed ring, in this embodiment outer ring 2'''. In this embodiment filament 20''' is wrapped inside a portion of groove 50, and then extended and looped at least at one portion 60 of filament 20''', such that filament 20''' is in contact with rotating ring, in this embodiment inner ring 3''', along a length 23''' proximate end 22'''. Alternatively, filament 20''' may be formed around a metallic snap ring with filaments attached to and surrounding snap ring along the length of the snap ring. In either case electrical conductive filaments 20''' can be a bundle of filaments, attached at either or both ends 21''' and 22''', and further may be braided or twisted along a length thereof.

Figure 15:
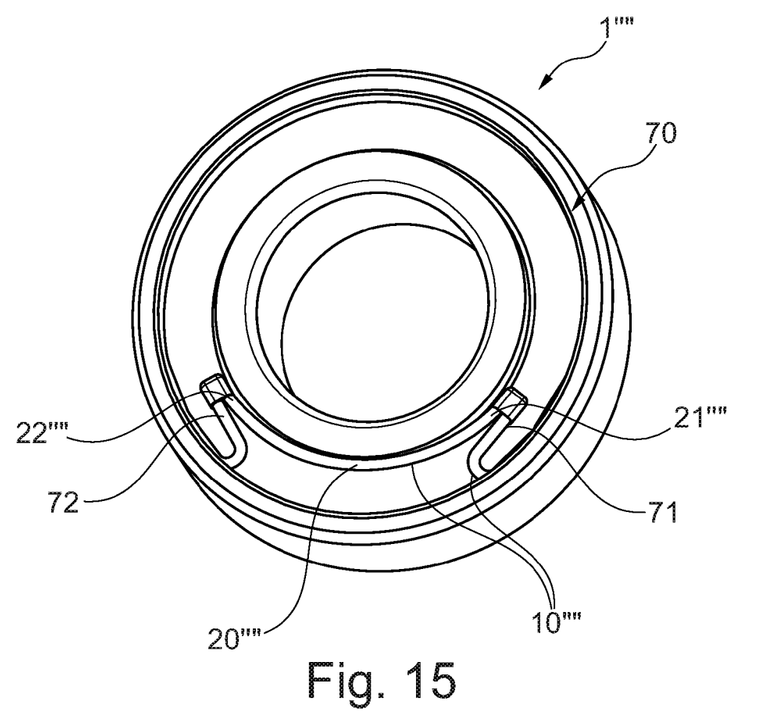
FIG. 15 illustrates a perspective view of a bearing according to a fifth example embodiment of the invention.
Figure 16:
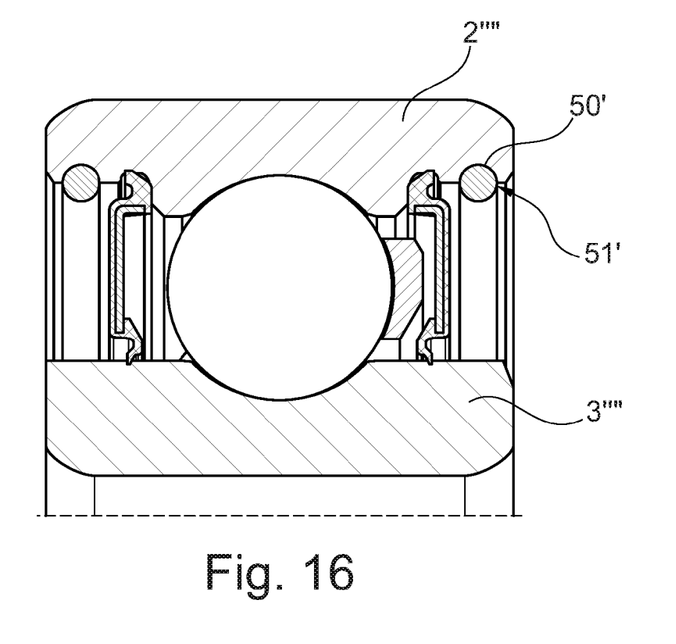
FIG. 16 illustrates a cross-sectional view of the bearing of FIG. 15, taken along line E-E.

FIGS. 15 and 16 illustrate a bearing according to a fifth example embodiment of the invention. Bearing 1'''' is similar in design and geometry to the embodiments previously disclosed in the present disclosure. In this embodiment electrical conductive element 10'''' is a combination of a conductive metallic snap ring 70 having ends 71 and 72, and electrical conductive filament 20'''', having ends 21'''' and 22'''', mechanically joined at their respective ends. Snap ring 70 seats in groove 50' engaged and recessed proximate lip 51' of outer ring 2''''. Snap ring 70 contacts groove 50' along at least a part of the entire circumference of groove 50', and has open ends 71 and 72 that are directed toward the rotating ring, in this embodiment inner ring 3'''', and fixedly connected to ends 21'''' and 22'''' of electrical conductive filament 20'''', or bundle of electrical conductive filaments. The connected of ends 71 to 21'''' and 72 to 22'''', respectively, can be accomplished by any known mechanical connection that will maintain contact between the respective ends, for example, by a cap that is crimped to keep the respective ends together and in contact, as in this example embodiment.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A bearing comprising:
    an outer ring having a first raceway;
    an inner ring having a second raceway;
    rolling elements disposed between the first and second raceways; and
    a closure element fixedly assembled to one of the inner ring or outer ring and extending in a direction of the other of the inner ring or the outer ring, the closure element having:
        at least one conductive filament having a first end, a second end, and an intermediate portion positioned between the first end and the second end,
        the at least one conductive filament assembled to the closure element, the first end contacting the outer ring, the intermediate portion contacting the inner ring to form an electrically conductive path between the outer ring and the inner ring, and the second end positioned away from the inner ring and fixed to the closure element.

2. The bearing of claim 1, wherein the at least one conductive filament is a bundle of filaments bound together at least at one of the first end or the second end.

3. The bearing of claim 2, wherein the bundle of filaments is braided.

4. The bearing of claim 1, wherein the closure element includes a second conductive filament.

5. The bearing of claim 1, wherein the at least one conductive filament is made of carbon fiber.

6. The bearing of claim 1, wherein the closure element is a polymer seal and the at least one conductive filament is at least partially mechanically attached to the seal.

7. The bearing of claim 1, wherein the at least one conductive filament contacts the outer ring along an outer length of the at least one conductive filament.

8. The bearing of claim 1, wherein an impedance of the closure element is less than an impedance of the bearing rolling elements.

* * * * *